(12) United States Patent (10) Patent No.: US 6,499,793 B2
Heselhaus et al. (45) Date of Patent: Dec. 31, 2002

(54) FOLDING FOR A CONVERTIBLE VEHICLE

(75) Inventors: Udo Heselhaus, Ibbenbueren (DE); Uwe Plassmeyer, Georgsmarienhuette (DE); Udo Rademacher, Osnabrueck (DE); Carsten Ventker, Osnabrueck (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/745,159

(22) Filed: Dec. 20, 2000

(65) Prior Publication Data

US 2002/0021020 A1 Feb. 21, 2002

(30) Foreign Application Priority Data

Dec. 31, 1999 (DE) ...................................... 299 23 087 U

(51) Int. Cl.$^7$ .................................................. B60J 7/12
(52) U.S. Cl. ............................ 296/107.14; 296/107.12; 296/107.09; 296/108
(58) Field of Search ............................... 296/108, 120.1, 296/123, 107.09, 107.12, 107.13, 107.14

(56) References Cited

U.S. PATENT DOCUMENTS

| | | | | |
|---|---|---|---|---|
| 2,833,593 A | * | 5/1958 | Oliver et al. | 296/107.07 |
| 2,860,913 A | * | 11/1958 | Kuiper et al. | 296/107.09 |
| 4,991,902 A | * | 2/1991 | Schrader et al. | 296/107.09 |
| 5,667,269 A | * | 9/1997 | Prenger et al. | 296/107.09 |
| 5,772,274 A | * | 6/1998 | Tokarz | 296/107.09 |
| 5,971,470 A | * | 10/1999 | May et al. | 296/107.09 |
| 6,209,945 B1 | * | 4/2001 | Aydt et al. | 296/107.15 |
| 6,322,130 B1 | * | 11/2001 | Wanden et al. | 280/756 |

* cited by examiner

*Primary Examiner*—D. Glenn Dayoan
*Assistant Examiner*—Patricia Engle
(74) *Attorney, Agent, or Firm*—Jordan and Hamburg LLP

(57) ABSTRACT

A folding top for a convertible vehicle including a folding top frame movable between a closed, stretched position and an open, compacted position. The top frame includes two rod linkage systems, each including a first leg and a frame section having a guide rail connected to the first leg and a holding strut movable relative to the guide rail and the first leg during movement of the top frame between the open and closed positions. A flexible skin is retained by the holding strut such that the skin is movable relative to the first leg during movement of the first leg to thereby reduce stresses on the skin.

29 Claims, 7 Drawing Sheets

FOLDING FOR A CONVERTIBLE VEHICLE

BACKGROUND OF THE INVENTION

Figure 1:
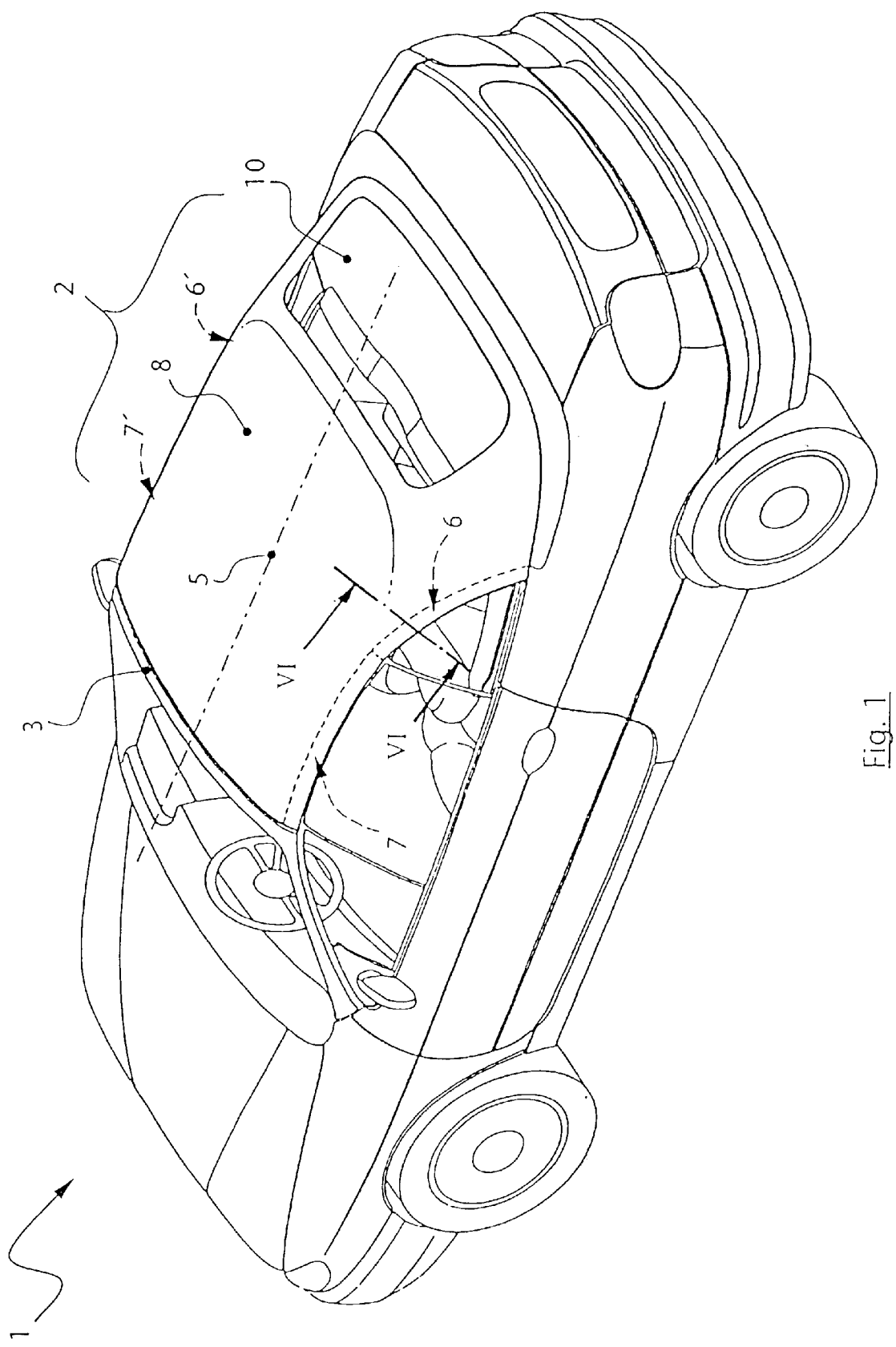

The invention relates to a folding top for a convertible vehicle.

In known convertibles of this type (such as described in German Patent Publication No. DE 44 41 668 C1), a folding top is provided having a flexible roof skin which is connected with rod linkage legs of the folding top frame. The roof skin is detachably fixed to the rear rod linkage leg in order to avoid overspreading during the opening and closing movements of the folding top and, in the closed position, the roof skin is fixed by a tensioning rope in the region of the rod linkage leg. During movement into the respective opening or closing position, it is cumbersome to control the tensioning rope and, in the event of a conceivable fatigue of the tensioning rope, a passage between the tensioning rope and the rod linkage leg into the passenger space is often formed.

SUMMARY OF THE INVENTION

The present invention is concerned with the problem of creating a folding top for a convertible vehicle having a roof skin which is held in the region of a rod linkage leg and can be shifted without fatigue with the folding top frame, this shifting taking place without overstressing the roof skin. The invention also makes it possible to provide optimum coverage of four-seated passenger spaces.

Generally, the folding top in accordance with the invention includes a rod linkage leg on each side of the folding top and a respective frame section. The frame section includes a first component which holds the material of the roof skin and a second component which is attached to a part of the rod linkage leg. The second component is movable relative to the first component so that the roof skin is movable relative to the rod linkage leg. In this manner, extreme stresses are not imparted to the roof skin during movement of the rod linkage legs.

More specifically, in the region of its roof skin connection to the folding frame, the folding top in accordance with the invention is provided with connecting units, which lie opposite one another in pairs at the folding top frame and are formed in each case by one of the rod linkage legs and a frame section, connected with the roof skin. The parts of the connecting unit are coupled over a restricted guidance in such a manner that relative movement between the region of the roof skin, held and connected to the frame section at the lateral edges, and the associated rod linkage leg is possible. The folding top, especially a flexible roof skin, permanently connected with the folding top frame or the respective frame section, can be moved during an opening or closing motion of the folding top frame in such a manner that movement and folding of the folding top which is gentle to the material and does not overstress it is achieved and, at the same time, even covers larger passenger spaces, such as a four-seater car, can be moved optimally.

Further details and advantageous effects of the invention arise out of the following description and the drawings, in which an example of the object of the invention is shown in greater detail.

IN THE DRAWINGS

Figure 2:
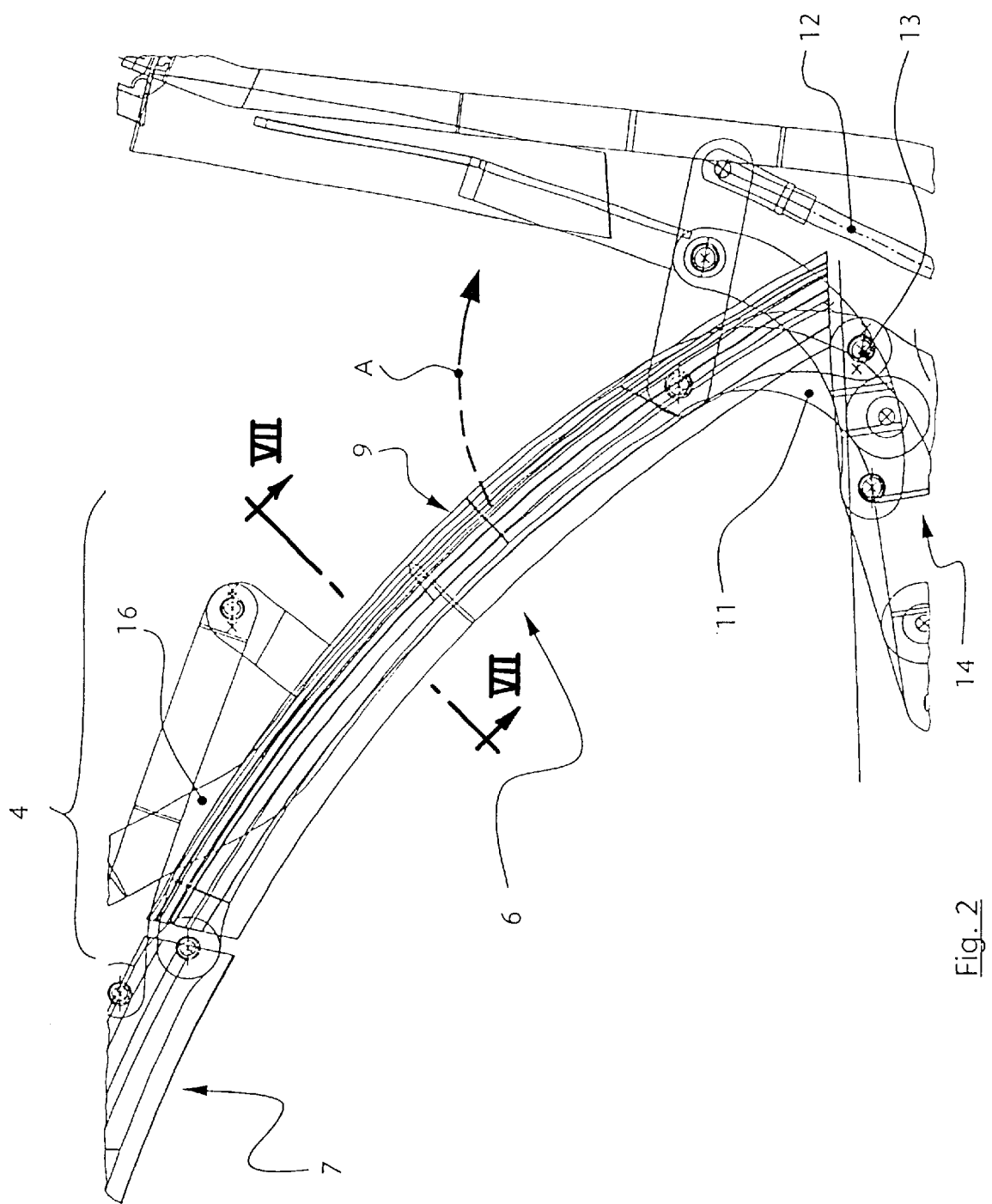
Figure 3:
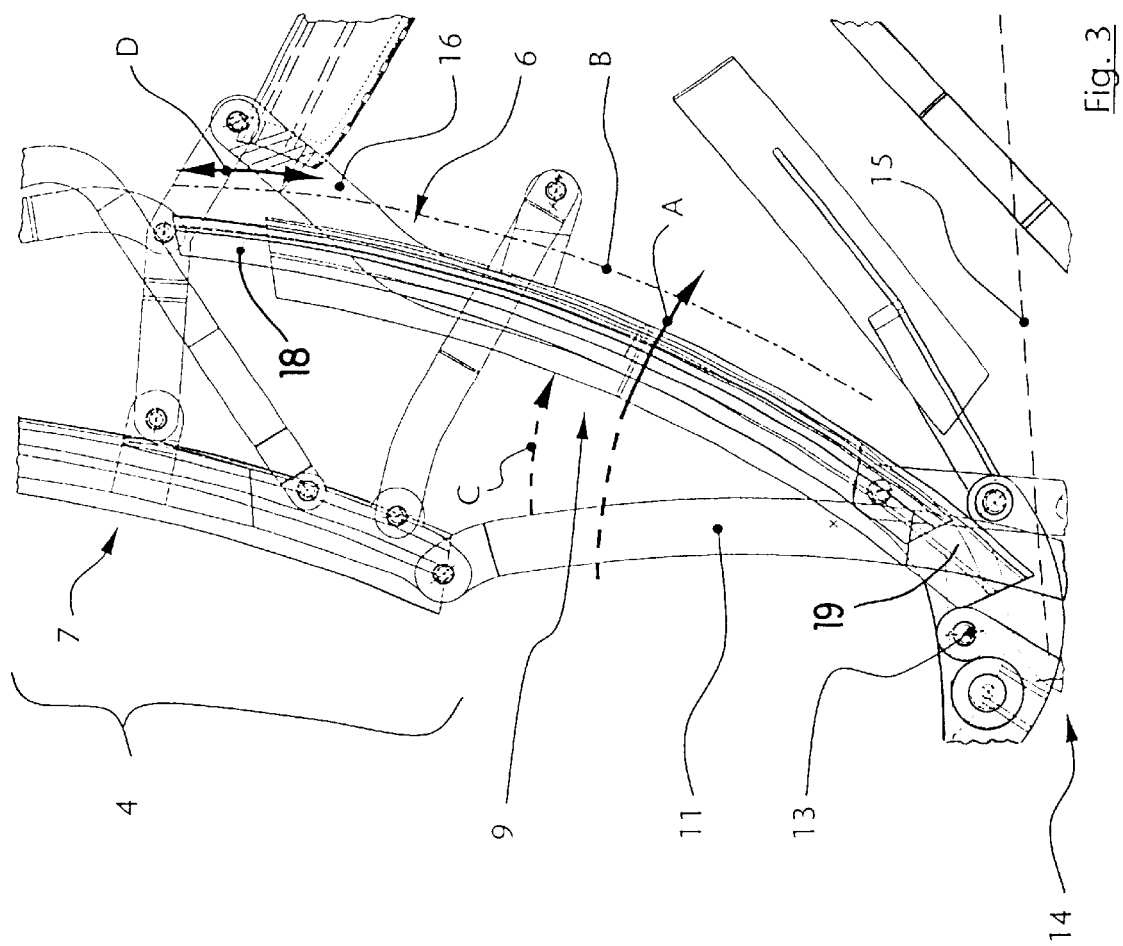
Figure 4:
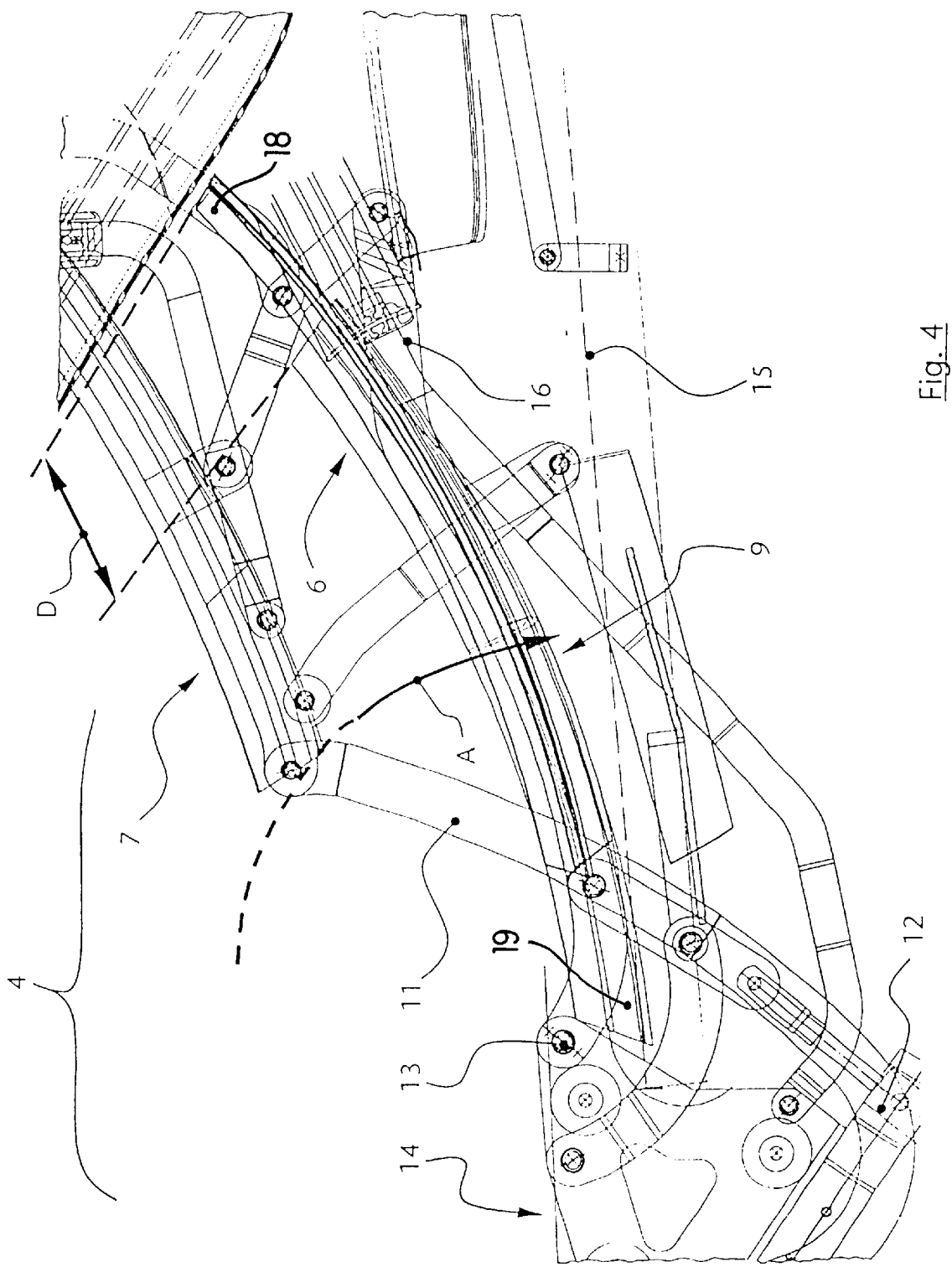
Figure 5:
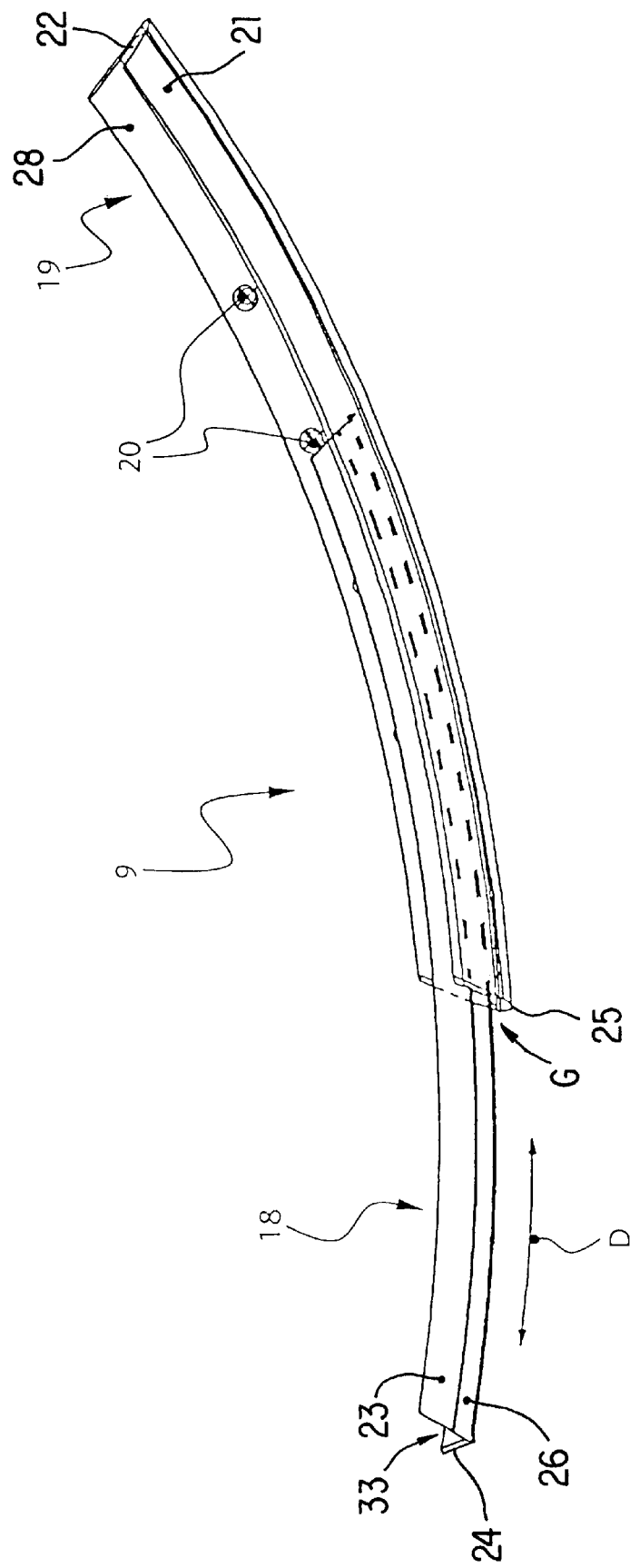
Figure 6:
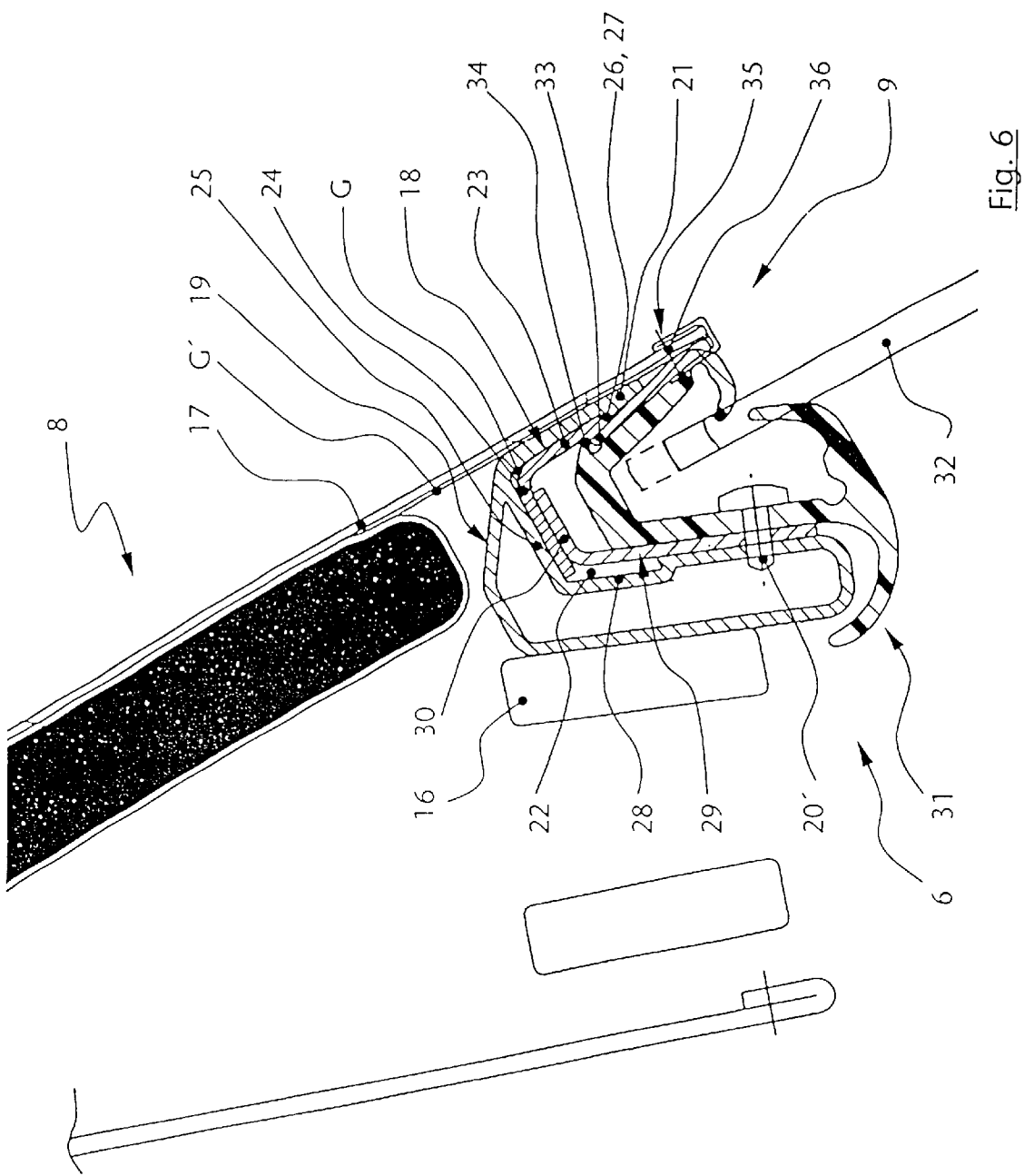
Figure 7:
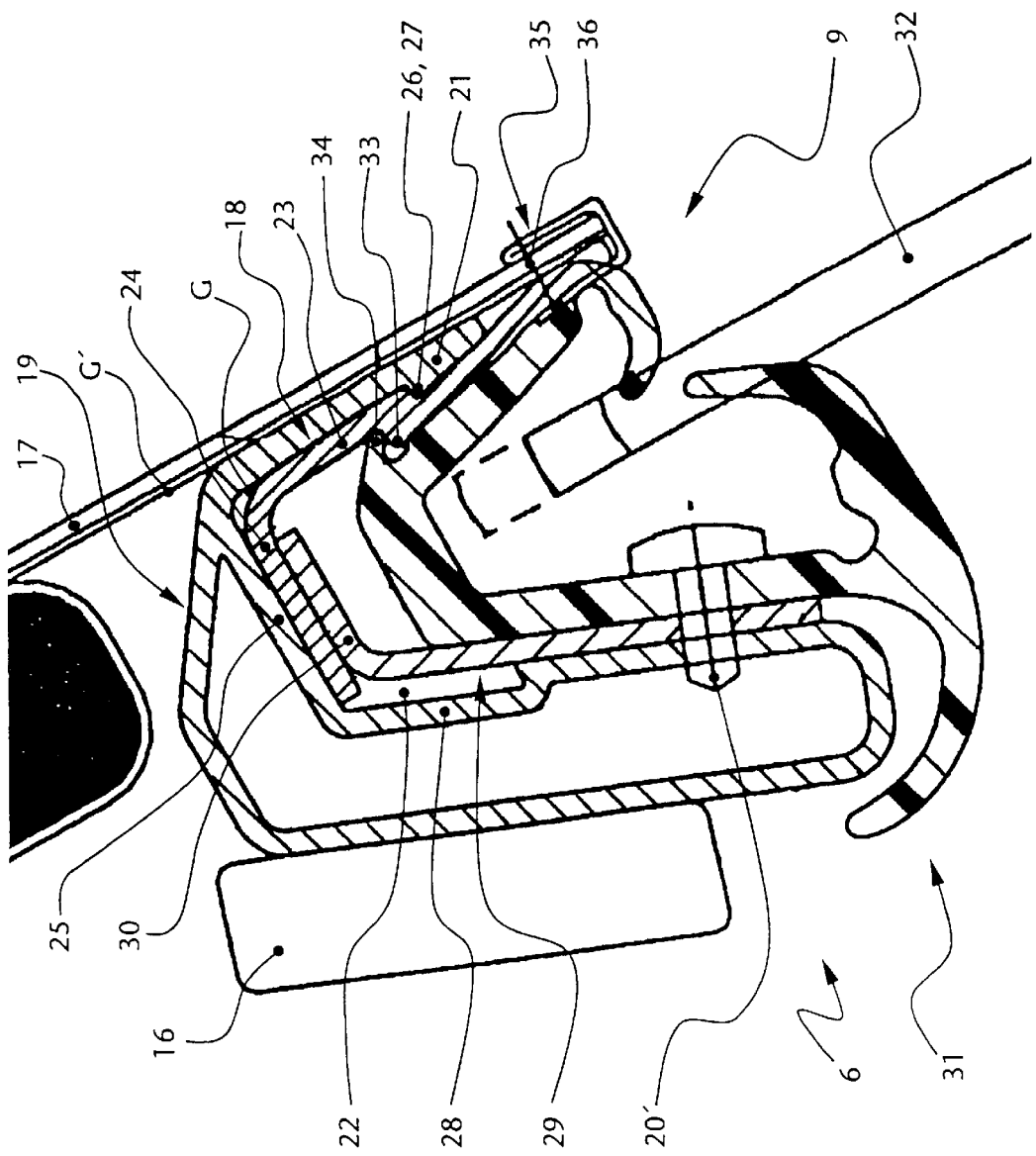

FIG. 1 shows a perspective rear view of a convertible vehicle with a folding top in the closed position, FIG. 2 shows an enlarged sectional representation of the folding top frame in the region of the rear rod linkage leg, FIG. 3 shows a sectional representation, similar to that of FIG. 2, with the rod linkage legs in a first opening phase, FIG. 4 shows a sectional representation, similar to that of FIG. 3, with the rod linkage legs in the rear opening position, FIG. 5 shows a representation of a detail of a frame section, which can be fixed at the rod linkage leg, FIG. 6 shows a sectional representation in the region of the rear blood linkage leg with the frame section of a line VI—VI in FIG. 1, and FIG. 7 is a cross-sectional taken along the line VI—VI of FIG. 2.

DETAILED DESCRIPTION OF THE INVENTION

In FIG. 1, a convertible is shown, which is labeled 1 as a whole and the top 2 of which, which is constructed as a folding top, can be moved into and out of the closed position into an opening position at the rear. As shown, the top 2 is in the closed position in which it lies against a windshield 3 of the convertible. The folding top 2 has a pivotable folding top frame 4 (FIG. 2) with rod linkage legs 6, 7, which lie opposite to one another in pairs, symmetrical to the longitudinal median plane 5 of the vehicle 1. In FIGS. 2–4, in each case only one side of the folding top frame 4 is shown, it being understood that corresponding rod linkage legs 6', 7' lie symmetrically opposite to the rod linkage legs 6 and 7, which are shown. With this construction of a folding top, a particularly flexible roof skin 8 of the folding top 2, having a rear window 10, is held.

The folding top frame 4, which is constructed in accordance with the invention, is provided in the region of at least one pair of rod linkage legs 6, 6' (or 7, 7'), lying opposite one another, with a frame section 9, which carries the roof skin 8 and includes a part which can be moved or shifted during the opening and closing movements (FIG. 2 to FIG. 4) relative to the rod linkage leg 6 (i.e., a part of the frame section 9 is shiftable or movable relative to a part of the rod linkage leg 6). In this manner, minimizing of the stresses in the folding top during the movement of the folding top 2 is possible and excessive stresses and/or unintentional crinkling of the roof skin 8 is avoided. At the same time, with this construction, missing lengths of material, which can arise during a stowage movement of the folding top 2 between the regions, where the roof skin is connected to parts of the folding top frame 4, can be bridged.

With this movable coupling between a part of the frame section 9 and a part of the rod linkage leg 6 in the region of the frame section 9, a folding top kinematics, provided for example with a Z fold, can be adapted to a covering of a larger passenger space, for example, a four-seater vehicle. In this connection, the folding top frame 4 may also have more than two rod linkage legs 6, 7, disposed one behind the other. Likewise, it is conceivable that, in the case of a construction of folding top regions between the opposite rod linkage legs with a rigid roof skin, all rigid roof panels (not shown), variable folding top kinematics can be achieved.

For moving the frame section 9 relative to the respective rod linkage leg 6, these components are constructed as a connected unit in the form of a restricted guidance. In particular, the frame section 9 is guided displaceably in the longitudinal direction of the rod linkage leg 6 (described in greater detail below with reference to FIG. 5).

The movement phases of the folding top frame 4 of FIGS. 2 to 4 make it clear that the respective frame section 9 can be swiveled together with the assigned linkage rod leg 6, yet while still allowing movement of the roof skin 8 relative to the rod linkage leg 6 via the movement of the holding strut 18 relative to the guide rail 19 as will be discussed below. In the case of this swiveling motion (arrow A) of the folding top frame 4, the frame section 9, in turn, can be shifted at least phase-wise on an arc-shaped curved longitudinal path B (FIG. 3), this longitudinal path B being determined essentially by the variation in the contour of the associated rod linkage leg 6. In this connection, it is also conceivable that the frame section 9 follows a three-dimensional curvature (not shown) of the longitudinal path B or of the rod linkage leg 6 during the folding top motion.

The folding top frame 4 in accordance with the invention can be adapted to vehicle roofs of different sizes because of the presence of several pairs 6, 6'; 7, 7' of rod linkage legs, having in each case shiftable frame sections 9, are provided (not shown), and, with that, the associated roof skin 8 experiences in several regions an optimum control, folding and tightening.

In the case of the convertible 1, shown in FIG. 1, the folding top frame 4 is provided at the edges with two rod linkage legs 6 and 7, which are disposed one behind the other in the longitudinal direction. In each case, the movable frame section 9 is provided in the region of the rod linkage leg pair 6, 6', which is the rear pair in the opening direction (arrow A).

The opening phase of FIG. 3 makes it clear that the rod linkage leg, which is generally labeled with 6, forms a main column 16 of the folding top frame 4 carrying the frame section 9. This main column 16 is arranged alongside the frame section 9 as can be seen in FIGS. 2–4, 6 and 7. When a known guide rod 11 is moved by means of a driving mechanism 12, this main column 16 is swiveled about a supporting bearing 13 of a main bearing 14 at the rear of the car body. From the superimposition shown in FIG. 2, the guide rod 11 and the main column 16, when movement A of the folding top is initiated, are swiveled into the expanded representation illustrated with arrow C in FIG. 3. At the same time, a relative movement, shown with an arrow direction D, is produced in the region of the frame section 9. By means of this relative movement, the roof skin 8 (FIG. 6), the details of which are not shown, when shifted further towards the rear region of the vehicle 1, is deposited in a controlled manner known in the vicinity of a parapet line 15 (FIG. 4). During a subsequent closing motion of the folding top frame 4 with the folding top 2, the frame section 9 and the parts of the rod linkage leg 6 are shifted in the reverse sequence.

The sectional representations of FIG. 6 and FIG. 7 illustrate the structural components of the above-described connecting unit at the rod linkage leg 6. In an advantageous embodiment, the shiftable frame section 9 is constructed as a structural unit, which is composed of several parts and has a holding strut 18, which is connected to on the outside with the folding top material 17 of the roof skin 8. This holding strut 18, in turn, is supported on a guide rail 19 fixed on a rod linkage leg 6 (or more specifically on the main column 16 of the rod linkage leg 16), these two parts 18 and 19 being connected for displacement in a longitudinal direction at least regionally by a slideway at G. Likewise, it is conceivable that the longitudinally displaceable parts 18 and 19 are connected to guide rollers or the like (not shown).

In FIG. 5, the frame section 9 is shown in a detailed representation as a two-part structural unit. In the upper region of the figure, the holding strut 18, which may be connected in the region of the school connections 20 with the rod linkage leg 6 (or the main column 16, FIG. 6), which is not shown, is moved out of the guide rails 19.

The guide rail 19 is constructed in cross section as a U-shaped profiled part and includes an accommodating trough 22 which is directed downward and constructed as an L-shaped profiled. The trough 22 is engaged by the holding strut 18 so that a positive connection is formed. On the one hand, the holding strut 18 is supported in the accommodating trough 22 with its long leg 23 in contact with the inside of the outer U-shaped profiled leg 21 and, on the other hand, it is guided in the region of a base leg 25 of the guide rail 19 so that its short leg 24 can slide at G.

The long leg 23 of the holding strut 18 is provided with a shoulder contour 26, which lies against a corresponding, complementary shaped hook contour 27 at the inside of the outer U-shaped profiled leg of the guide rail 19, so that the two shaped parts interlock with one another as an additional guiding contour. For guiding and supporting the holding strut 18 in the region of the base leg 25 (sliding guidance G), a supporting rail 29 is arranged in the accommodating trough 22. The supporting rail 29 is fixed to an inner U-shaped profiled part 28 of the guide rail 19 and has an L-shaped profile. As shown in FIG. 6, a shorter leg 30 of the supporting rail 29 abuts the short leg 24 of the holding strut 18. With this connecting construction, the holding strut 18, carrying the roof skin 8, can be shifted relative to the guide rail 19 corresponding to the movement shown in FIGS. 3 and 4 (arrow D).

Instead of the connecting construction described above, it is conceivable that the guide rail 19 and the holding strut 18 may be formed from two extruded profiles (not shown), which can be pushed directly into one another, so that the design of the connecting construction is simplified.

FIGS. 6 and 7 further show that a sealing cord 31 into which a rear window pane 10 can be pushed, is provided in the guide rail 19, fitting into the U-shaped profile of the guide rail 19. The sealing cord 31 is connected by a screw connection 20' with the guide rail 19 and lies with a latch 34 against a shoulder contour 33 in such a manner that the sealing cord 31 is held in a substantially fixed position in the accommodating trough 22 between the parts 18 and 19.

In an advantageous embodiment, a sliding coating is provided between the holding strut 18 and the guide rail 19. This can be integrated in the connecting construction at G and/or in the vicinity of region 35 of where the folding top material 17 is connected to the long leg 23 of the holding strut 18. In FIG. 6, a sliding coating G' is shown, which is provided at the inside of the folding top material 17 as a sliding surface at the outer U-shaped profiled leg 21 of the guide rail 19. Whereas a displacement is easily accomplished (arrow D), wear of parts sliding on one another is thereby avoided.

The material 17 of the folding top is connected in the region 35 to the holding strut 18, specifically, it is connected by a seam 36 with the holding strut 18. Likewise, the connection in the region 35 can conceivably be a welded connection. Above the connection in the region 35, the profiled leg 21 of the guide rail 19, during the installation of the parts, can be pushed as if it were a tab into the installed position between the sliding layer G' and the holding strut 18, such that the connection catches in the region of the undercut profile the contours 26, 27.

What is claimed is:
1. A folding top for a convertible vehicle, comprising:
   a folding top frame movable between a closed, stretched position and an open, compacted position, said top frame including two rod linkage systems, each of said rod linkage systems including a first leg and a frame section having a first part connected to said first leg and a second part movable relative to said first part and to said first leg during movement of said top frame between the open and closed positions; and a flexible skin retained by said second parts of said frame sections such that said skin is movable relative to said first leg during movement of said first leg to thereby reduce stresses on said skin.

2. The folding top of claim 1, wherein each of said rod linkage systems further includes a second leg movably linked to said first leg.

3. The folding top of claim 1, wherein said rod linkage systems are adapted to be arranged on opposite sides of a longitudinal median plane of the vehicle and symmetrical to the longitudinal median plane.

4. The folding top of claim 1, wherein said second part of each of said frame sections is connected to said skin.

5. The folding top of claim 1, wherein each of said first legs has a longitudinal dimension, said second part of each of said frame sections being movable relative to the respective connected one of said first legs in the longitudinal direction.

6. The folding top of claim 1, wherein each of said frame sections is rotatable jointly with the respective connected one of said first legs.

7. The folding top of claim 6, wherein each of said frame sections is movable in an arc-shaped curve relative to the respective connected one of said first legs.

8. The folding top of claim 1, wherein each of said frame sections is movable in an arc-shaped curve relative to the respective connected one of said first legs.

9. The folding top of claim 1, wherein each of said rod linkage systems further includes at least one additional leg arranged in front of said first leg such that said first leg is a rearmost one of said legs of said rod linkage system.

10. The folding top of claim 1, wherein said first legs are arranged opposite one another.

11. The folding top of claims 1, wherein said second part of each of said frame sections is a holding strut connected to said skin and said first part of each of said frame sections is a guide rail connected to said first leg and movably supporting said holding strut.

12. The folding top of claim 11, wherein said guide rail has a U-shaped cross-section defining a trough, said holding strut being movable in said trough.

13. The folding top of claim 12, wherein said guide rail is arranged such that said trough faces downward.

14. The folding top of claim 11, wherein said holding strut and said guide rail are structured and arranged such that said holding strut is longitudinally displaceable relative to said guide rail.

15. The folding top of claim 11, wherein said holding strut is substantially L-shaped and has first and second legs arranged opposite an inner surface of a respective leg of said guide rail.

16. The folding top of claim 11, wherein said holding strut has a long leg having a shoulder contour and said guide rail has an outer U-shaped profiled leg having a hook contour arranged to mate with said shoulder contour of said long leg of said holding strut.

17. The folding top of claim 16, further comprising a coating arranged on at least one of said outer U-shaped profiled leg of said guide rail and said skin.

18. The folding top of claim 11, wherein said guide rail has an inner U-shaped profiled leg, said frame section further comprising an L-shaped supporting rail having a first leg connected to said inner U-shaped profiled leg of said guide rail and a second leg spaced from an opposed surface of said inner U-shaped profiled leg of said guide rail to thereby define a passage between said guide rail and said supporting rail in which said holding strut moves.

19. The folding top of claim 11, wherein said guide rail and said holding strut are formed by two extruded profiles pushed directly into one another.

20. The folding top of claim 11, further comprising a coating arranged on at least one of said guide rail and said holding strut in a region where said holding strut moves relative to said guide rail.

21. The folding top of claim 11, wherein said frame section further comprises a sealing cord arranged in connection with said guide rail.

22. The folding top of claim 21, wherein said sealing cord is fixedly connected to said guide rail and includes a latch engaging with a shoulder contour of said holding strut.

23. The folding top of claim 11, wherein said skin has a seam along each lateral edge, said holding strut being connected to said skin at said seam.

24. The folding top of claim 11, wherein said skin has a lateral edge welded to said holding strut.

25. The folding top of claim 11, further comprising connecting means for fixedly connecting said first leg to said holding strut.

26. The folding top of claim 11, further comprising a coating arranged on at least one of said first leg and said second part of said frame section in a region wherein said second part of said frame section moves relative to said first leg.

27. The folding top of claim 11, wherein said skin has a seam along each lateral edge, said second part of said frame section being connected to said skin at said seam.

28. The folding top of claim 11, wherein said skin has a lateral edge welded to said second part of said frame sections.

29. The folding top of claim 1, further comprising connecting means for fixedly connecting said first leg to said first part of said frame section.

* * * * *